United States Patent [19]

Gotthold

[11] 4,395,236
[45] Jul. 26, 1983

[54] METHOD OF GENERATING PROCESS INSTRUCTIONS

[76] Inventor: John P. Gotthold, 1258 Mandarin Dr., Sunnyvale, Calif. 94087

[21] Appl. No.: 307,726

[22] Filed: Oct. 2, 1981

[51] Int. Cl.³ .............................................. G09B 19/00
[52] U.S. Cl. .................... 434/219; 358/335; 434/307
[58] Field of Search .................. 434/307, 219, 224; 358/335, 160

[56] References Cited

U.S. PATENT DOCUMENTS

| | | | |
|---|---|---|---|
| 2,682,117 | 6/1954 | Wales | 434/219 |
| 2,805,471 | 9/1957 | Lowden | 434/224 X |
| 3,619,886 | 11/1971 | Sauve et al. | 434/224 X |
| 3,860,745 | 1/1975 | Takada | 434/307 X |
| 3,984,625 | 10/1976 | Camras | 358/335 X |
| 4,084,198 | 4/1978 | Lemelson | 358/335 X |
| 4,198,656 | 4/1980 | Mathisen | 358/335 X |
| 4,302,776 | 11/1981 | Taylor et al. | 358/160 |

Primary Examiner—William H. Grieb
Attorney, Agent, or Firm—Gerald L. Moore

[57] ABSTRACT

The method of generating a set of instructions for teaching a process including the generation of a video image of each step of the process while viewing the image on a video monitor for correction and adjustment, printing over the image various characters representing instructions to teach the process, printing a hard copy photograph of the process and recording the video image on a recorder for future use.

3 Claims, 1 Drawing Figure

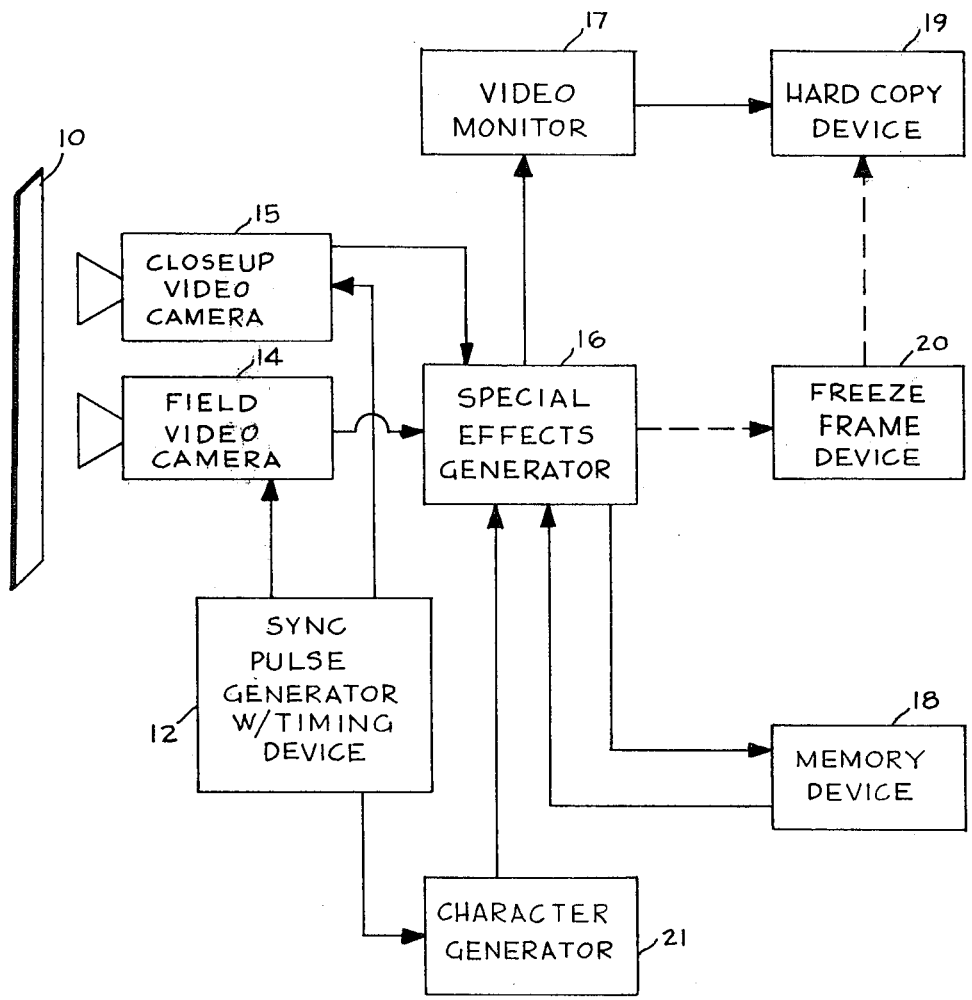

METHOD OF GENERATING PROCESS INSTRUCTIONS

FIELD OF THE INVENTION

A method of generating hard copy instructions for industrial processes such as assembling electronic and mechanical devices, wherein the process steps are viewed with a video camera to assure accuracy and clarity and hard copies are printed directly from the video signals and the images are also stored in a memory device for future use and printing.

BACKGROUND OF THE INVENTION

With the reduced size and increased complexity of electronic and mechanical devices, the manufacture of the devices has become increasingly more complicated. Assemblers must be shown each precise step in assembling the devices and, because of the reduced size, mistakes are frequently hard to detect prior to final test. At this point the correction of any mistakes detected can require disassembly and be very costly. Thus there exists a severe need to generate accurate instructions for assemblers, quality inspectors, test personnel, service personnel and the like and possibly more important, a need to update such instructions easily and quickly in response to engineering changes.

For assembling such devices as electronic circuit boards, electrical devices and small mechanical apparatus, it has been found that photographs are the most useful tool for teaching the assemblers and other workers the various process steps. In the past, such photographs have been generated by use of 35 MM cameras or the instant printout cameras. Of course, if the film has to be sent away for development, the time for generating the pictures is much longer and thereafter if corrections have to made, the time is extended substantially. With the instant cameras, the photograph is supplied right away but it is more difficult to generate enlarged photographs having high picture quality. With the use of the cameras the cost has been quite high. Additionally the requirement to identify the pictured items with words and/or symbols necessitates a high cost for typing and/or labeling by hand methods.

The need for accurate process instructions to assist the assemblers of electronic and mechanical apparatus is heightened by the fact that such work is tedious thereby causing a higher turnover of personnel. Additionally the technology changes very rapidly and because of the intricate nature of the work, engineering change orders are more frequent. Additionally the assembly function is frequently shifted to other locations throughout the world creating the need to generate instructions in other languages for use at the new locations.

Thus the need has become increasingly greater for a method to quickly generate process instructions showing intricate steps to be used by the assembler and other workers. It is the purpose of the present invention to satisfy that need by providing a system for not only generating quickly such instructions but also allowing the instantaneous review and alteration of such instructions for updating and correction.

SUMMARY OF THE INVENTION

The method of generating process instructions includes the steps for conducting a process such as an electronic circuit board assembly and the like, comprising the steps of assembling the articles to be assembled and photographing the assembly processes with a video camera. A video monitor allows the immediate viewing of the image for adjusting and correction and when satisfactory, the video signal is fed to a memory device for recording. Additionally the video signal is fed to a hard copy device to supply instantaneously a hard copy photograph-like record of the process step. When desired, a character generator is used to overlay instructions or legends on the video image prior to generation of the hard copy record and/or a special effects generator is utilized to integrate the closeup video camera photograph into the first image to provide for a closeup to illustrate particular details. In this manner a step-by-step process instruction is generated for immediate use by the assemblers.

DESCRIPTION OF THE DRAWINGS

FIG. 1 is a partial schematic and block diagram showing the apparatus for carrying out the method of the present invention for generating process instructions.

This system is being used to photograph a printed circuit board 10 as an example of the type of process with which the subject invention can be used to provide immediate and accurate process instructions. For this purpose the assembly process is displayed in sequential status showing the consecutive assembly of various components (not shown) which are to be mounted onto the circuit board. In this case the components are assembled one-at-a-time and images taken of the board after each component has been put into the proper place.

To generally explain the invention, the process instruction generating device shown in FIG. 1 utilizes a synchronizing pulse generator 12 to provide coordinated drive signals to a field video camera 14 and a closeup video camera 15. The outputs in the form of video signals are supplied to the special effects generator 16 which in turn supplies the video signal to a video monitor 17 to be viewed for determining the sufficiency of the display. If the display is satisfactory, the video signal is supplied to a memory video image. At the same time the video signal is supplied to a hard copy device 19 which is capable of printing a good resolution hard copy photograph-like record for use in the instruction set being generated or said video signal is frozen by a freeze frame device 20 to insure that it doesn't change and then fed to said hard copy device.

To explain the process in more detail, the field video camera 14 is of the type capable of producing a high resolution video signal generally defined as utilizing more than 256 scan lines per frame in color or black and white. Preferably the camera is equipped with an adjustable lens to allow focusing onto the object or objects which are involved in the step of the process being recorded. An example of a suitable video camera is the Panasonic Wv-1300A.

The video image from the field camera 14 is fed to the special effects generator 16 which is capable of integrating several video signals. An example of a suitable special effects generator is the Shintron Chromatic Model 370 Mark III. Also fed to this generator is the video signal from the closeup video camera 15 which preferably is equipped with an adjustable lens that can be focused on the object or objects for viewing the critical parts or interfaces in closer detail. An example of such a suitable camera is the Panasonic Wv-1300A. The special effects generator 16 integrates the video signals from the two video cameras and also receives print characters or symbols such as part numbers, instructions, et cetera, from the character generator 21, which can be imaged with the pictorial video image from the video cameras for a simultaneous showing of the process step and a displaying of identifying characters or instructions. This composite image is directed to the video monitor 17 which is capable of high resolution black and white or color video display. A suitable type video monitor for use in the present system is the Conrack ENA 12C.

In accordance with the present invention, the use of the instantaneous viewing in real time of the image to be hard copied for the process instruction allows alteration and correction prior to the image being hard copied. This capability provides for better photographs because the composition of the image can be altered, the items changed in relative position or the light or angle changed so as to better display the process to be projected. It is this real time alteration which adds immeasurably to the generation of the process instructions and which is not provided for in past art.

Once the image has been determined satisfactory by viewing it on the monitor 17, a copy can be made on a paper media by the hard copy device 19 which received the video signal from the video monitor as transmitted from the special effects generator. A suitable hard copy device is the Honeywell Video Graphic Recorder Model VGR 4000. This copy is satisfactory for immediate insertion into the process manual as would be necessary in updating the manual and since alterations were made in the image prior to the hard copy photograph-like record being generated, the hard copy can be of more complete detail.

The memory device 18 which is fed the video signal for electronic recording is capable of storing and redisplaying the composite video image. The type suitable for this purpose is the Sony Model 1264 ½" Video Tape Recorder. Additionally the freeze frame device 20 can be of the type 290 Video Transiver made by Colorado Video. This device is capable of the instant storing and redisplaying of an image on the video monitor while the same composite video image is being copied by the hard copy device.

When it is desired to overprint on the image to indicate instructions, part numbers, etc., a character generator 21 is provided. In this manner the instructions can be written over the video pictorial images with identifying links extending to the components wherever applicable. A suitable character generator is the Model K60 Video Character Generator made by Knox Video Products.

Thus it can be seen that there has been described a process for generating instructions which process enables the user to view the process steps being hard copied prior to the actual hard copying to assure the effectiveness of the image being displayed. Additionally, any number of hard copies can be generated for inclusion in the process instruction or sets of instructions and by storing the image in the memory device, it can be realized for making additional hard copies or alterations.

The method represents a substantial improvement over past methods by combining a number of functions into one system to allow the close monitoring of the image prior to hard copying, the overlay of characters on the pictorial image and the regeneration of the image for alteration and updating.

I claim:

1. The method of generating a set of instructions for conducting a process, comprising the steps of:

conducting the process to show the various steps of the process in sequential order;

imaging each step of the process with a video camera to generate a video signal;

supplying the video signal to a video monitor to allow study of the image for correction and alteration;

generating a hard copy of the image by supplying the video signal to a hard copy device capable of receiving a video signal and generating a hard copy photograph-like record on a paper-like medium;

recording the video signal on a video signal recorder for future use in generating subsequent hard copies; and assembling the hard copies in proper sequence to form a set of instructions showing the process.

2. The method as defined in claim 1 including the step of imaging characters indicating instructions on the pictorial image by use of a character generator prior to generating a hard copy and prior to recording the video signal.

3. The method as defined in claim 1 including the imaging of the objects of the process with both closeup and field video cameras and utilizing a special effects generator to generate a composite video signal including characters generated by a character generator.

* * * * *